United States Patent
Spychala et al.

(10) Patent No.: US 12,129,983 B2
(45) Date of Patent: Oct. 29, 2024

(54) OPTIMIZING A PREDICTIVE DYNAMIC BENDING LIGHT FUNCTION OF A LIGHTING SYSTEM

(71) Applicant: Ford Global Technologies, LLC, Dearborn, MI (US)

(72) Inventors: Aleksander Bronislaw Spychala, Cologne (DE); Thomas Erber, Cologne (DE); Janos Golumba, Huerth (DE); Lars Junker, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 553 days.

(21) Appl. No.: 17/466,096

(22) Filed: Sep. 3, 2021

(65) Prior Publication Data

US 2022/0074566 A1 Mar. 10, 2022

(30) Foreign Application Priority Data

Sep. 7, 2020 (DE) .......................... 102020211190.1

(51) Int. Cl.
*F21S 41/657* (2018.01)
*B60Q 1/076* (2006.01)
(Continued)

(52) U.S. Cl.
CPC ............ *F21S 41/657* (2018.01); *B60Q 1/076* (2013.01); *B60Q 1/08* (2013.01); *F21V 21/15* (2013.01); *G06N 3/04* (2013.01); *B60Q 2300/00* (2013.01)

(58) Field of Classification Search
CPC ..... G05B 17/02; G06F 11/3668; G06N 3/126; G06N 3/12; G06N 3/086; B60Q 1/04;
(Continued)

(56) References Cited

U.S. PATENT DOCUMENTS 8,311,069 B2 * 11/2012 Dantus ..................... G01J 11/00
372/21
8,757,853 B2 * 6/2014 Robert ..................... B60Q 1/12
362/465
(Continued)

FOREIGN PATENT DOCUMENTS

| CN | 108216009 A | 6/2018 | |
| CN | 108312957 A * | 7/2018 | ............. B60Q 1/122 |

(Continued)

OTHER PUBLICATIONS

Shadeed, H., Jörg Wallaschek, and S. Mojrzisch. "On intelligent adaptive vehicle front-lighting assistance systems." 2007 IEEE Intelligent Transportation Systems Conference. IEEE, (Year: 2007).*
(Continued)

*Primary Examiner* — Cuong H Nguyen
(74) *Attorney, Agent, or Firm* — Frank A. MacKenzie; Bejin Bieneman PLC (57) ABSTRACT

Automatically optimizing a predictive dynamic bending light function of a vehicle lighting system comprises configuring a bending light control unit for controlling the lighting system with initial bending light control parameter values as control parameter values to be used, configuring a classification unit for automatically classifying a performance of the bending light control unit into a desired and at least one further performance class, depending on output values of the control unit, configuring a control parameter optimization unit for ascertaining updated control parameter values depending on input values of the control unit and classifications of the performance assigned to them, as well as acquiring driving trajectory parameter values as the input values during a journey, ascertaining output values of the control unit, automatically classifying the performance depending on the ascertained output values, ascertaining updated control parameter values and adapting the control
(Continued)

parameter values to be used to the updated control parameter values, wherein the ascertainment of updated control parameter values comprises the application of a genetic algorithm with which a frequency of a classification of the performance into the desired performance class is increased.

20 Claims, 2 Drawing Sheets

(51) Int. Cl.
  *B60Q 1/08* (2006.01)
  *F21V 21/15* (2006.01)
  *G06N 3/04* (2023.01)
(58) Field of Classification Search
  CPC . B60Q 1/045; B60Q 1/08; B60Q 1/12; B60Q 2300/122; B60Q 2300/124; B60Q 2300/322
  USPC .................................................. 362/465–466
  See application file for complete search history.

(56) References Cited

U.S. PATENT DOCUMENTS

| | | | | |
|---|---|---|---|---|
| 10,501,004 | B2* | 12/2019 | Li | F21S 41/657 |
| 2011/0075435 | A1* | 3/2011 | Robert | B60Q 1/1423 |
| | | | | 362/465 |
| 2012/0136549 | A1* | 5/2012 | Bradai | G01C 21/3697 |
| | | | | 701/93 |
| 2017/0334337 | A1* | 11/2017 | Ohno | B62D 15/021 |
| 2018/0222378 | A1* | 8/2018 | Li | F21S 41/635 |

FOREIGN PATENT DOCUMENTS

| | | | | | |
|---|---|---|---|---|---|
| CN | 108372824 | A | * | 8/2018 | ............. B60Q 1/085 |
| CN | 110588499 | A | | 12/2019 | |
| DE | 102006053328 | B4 | * | 12/2008 | ............. B60R 25/24 |
| EP | 1905643 | B1 | * | 3/2013 | ............. B60Q 1/085 |
| EP | 3246204 | B1 | * | 5/2019 | ............. B60Q 1/085 |
| FR | 2950579 | A1 | * | 4/2011 | ............... B60Q 1/12 |
| JP | 2011073671 | A | * | 4/2011 | ............... B60Q 1/12 |
| JP | 5680922 | B2 | * | 3/2015 | ............... B60Q 1/12 |
| WO | WO-2020012241 | A1 | * | 1/2020 | ......... G01C 21/3407 |

OTHER PUBLICATIONS

Shadeed, Hatem. "Development of a light-based driver assistance system." (Year: 2012).*
Perng, Jau Woei, et al. "Development of an embedded road boundary detection system based on deep learning." Image and vision computing 100 (2020): 103935 (Year: 2020).*
Jeong, YiNa, et al. "An integrated self-diagnosis system for an autonomous vehicle based on an IoT gateway and deep learning." Applied Sciences 8.7 (2018): 1164 (Year: 2018).*
Hamdia, Khader M., Xiaoying Zhuang, and Timon Rabczuk. "An efficient optimization approach for designing machine learning models based on genetic algorithm." Neural Computing and Applications 33.6 (2021): 1923-1933. (Year: 2021).*
A. Lambora, K. Gupta and K. Chopra, "Genetic Algorithm—A Literature Review," 2019 International Conference on Machine Learning, Big Data, Cloud and Parallel Computing (COMITCon), Faridabad, India, 2019, pp. 380-384, doi: 10.1109/COMITCon.2019.8862255. (Year: 2019).*
Albadr, Musatafa Abbas, et al. "Genetic algorithm based on natural selection theory for optimization problems." Symmetry 12.11 (2020): 1758. (Year: 2020).*

* cited by examiner

OPTIMIZING A PREDICTIVE DYNAMIC BENDING LIGHT FUNCTION OF A LIGHTING SYSTEM

CROSS-REFERENCE TO RELATED APPLICATION

This patent application claims priority to German Application No. DE 102020211190.1, filed on Sep. 7, 2020, which is hereby incorporated by reference in its entirety.

FIELD

The present disclosure relates to a method for automatically optimizing a predictive dynamic bending light function of a lighting system of a vehicle, a lighting system for a vehicle with an automatic self-optimizing predictive dynamic bending light function with which the method can be carried out, and a vehicle that comprises a lighting system of this sort. The disclosure additionally relates to a computer program product suitable for operating the lighting system.

BACKGROUND

Dynamic bending light is a vehicle assistance function in which the lighting direction, i.e. the direction in which light is radiated from the front headlamps of a vehicle, is changed dynamically depending on the course of the bend of the road being driven in order to better illuminate the bend being driven. Predictive dynamic bending light (PDBL) provides that the lighting direction does not merely track, but that, by evaluating sensor signals that characterize the driving trajectory, such as video recordings from a front camera, and further driving trajectory parameter values such as the profile of the steering angle of the steering wheel of the vehicle, as well as other sensor signals provided, for example, as driving trajectory parameter values via the CAN bus of the vehicle, such as the vehicle speed, the yaw rate, the engaged gear, the status of the direction indicator, is adjusted in anticipation, before the reaction of the driver, in such a way that the road is at all times illuminated as appropriately as possible, even when cornering. Vehicle state parameter values such as the speed are, while driving, also driving trajectory parameter values such as the course of the road detected in the video recordings or other information available in the vehicle that characterize the driving trajectory.

How good the performance of the lighting system of the vehicle in which the lighting direction of the vehicle headlamp is controlled by a PDBL control unit, i.e. a bending light control unit, actually is, i.e. how accurately the illumination of the road achieved over a sequence of time segments corresponds to the most suitable illumination, depends here on the quality of the adaptation of the controller by the PDBL control unit to the real driving situation. Values for control parameters of the PDBL control unit, i.e. bending light control parameter values, can, for example, be ascertained for this purpose in that recorded test driving data are used in order to test, on the basis of a model of the PDBL control unit, how the PDBL control unit would behave, wherein, depending on the result achieved, a test manager changes bending light control parameter values, for example, specific decision threshold values, changeover speeds between control states, filter sensitivities etc., in order to improve the result. A PDBL control unit, or its model provided by a Rapid Control Prototyping platform, that has been initialized, i.e. preset, with bending light control parameter values determined in this way, can then also be tested in real test journeys. Such a procedure, however, including the preparation and data evaluation, requires a significant expenditure of time and resources.

In addition, the real performance, i.e., the true performance, of the lighting system of the vehicle in which the lighting direction of the vehicle headlamp is controlled by a PDBL control unit, also depends strongly on, for example, the state of the road, the dynamically changing driving or traffic situations in which the respective vehicle is being used, as well as on the individual driving style of the driver of the vehicle. An optimization of the performance, i.e. of how well the course of the road illumination can approach an ideally suitable illumination, should therefore take the real, individual usage conditions of the respective vehicle into consideration.

An adaptive control system for the control of vehicle headlamps based on machine vision is disclosed in CN110588499A, in which light sources in video images, in particular headlamps of other road users, are localized, wherein, with the aid of a support vector machine trained on the basis of training data, a decision is taken as to how the vehicle's own headlamps should be directed in order to avoid disturbing the other road users.

A predictive bending light controller that controls the orientation of the headlamps on the basis of GPS data and map information as well as steering angle and speed information is described in CN108216009A.

A predictive bending light system for a vehicle is described in CN108312957A, in which, on the basis of the vehicle speed and of video information regarding the road, the bend radius and the distance from the bend are ascertained, and a neural network trained with test data determines a rotation angle of the driving headlamp with which the driving headlamps are predictively directed.

SUMMARY

The present disclosure includes optimizing the behavior of the predictive dynamic bending light function of a lighting system of a vehicle in a simple, rapid manner, under the individual operating circumstances of the respective vehicle.

According to a first aspect, a method for automatically optimizing a predictive dynamic bending light function of a lighting system of a vehicle comprises a step of configuring a bending light control unit for controlling a lighting system of the vehicle with initial bending light control parameter values as bending light control parameter values to be used, a step of configuring a classification unit (connected to the bending light control unit) for automatically classifying a performance of the bending light control unit into a desired performance class, i.e. a target performance class, and at least one further performance class, i.e. at least one faulty performance class, depending on output values of the bending light control unit, and a step of configuring a control parameter optimization unit (connected to the bending light control unit and the classification unit) for ascertaining updated bending light control parameter values depending on input values of the bending light control unit and classifications of the performance of the bending light control unit assigned to the input values.

The method additionally comprises the step of acquiring driving trajectory parameter values as the input values of the bending light control unit during at least one journey of the vehicle, steps of ascertaining output values of the bending light control unit and of automatically classifying the performance of the bending light control unit depending on the ascertained output values during the at least one journey, as well as steps of ascertaining updated bending light control parameter values and of adapting the bending light control parameter values to be used to the updated bending light control parameter values.

It is provided that the ascertainment of updated bending light control parameter values comprises the application of a genetic algorithm with which a frequency of a classification of the performance of the bending light control unit into the desired performance class is increased. This entails reducing a frequency of the classification into the at least one further class (in which incorrect, i.e. faulty, classifications are recorded).

The lighting system or driving light system of the vehicle comprises at least one or a plurality of driving headlamps. The bending light function of the lighting system refers to its functionality of changing the illumination direction, i.e. the lighting direction, of the driving headlamp depending on the course of the bend. The driving headlamps are, for example, mounted rotatably for this purpose and connected to motors that receive control signals from the bending light control unit in order to turn the driving headlamps in order to adjust the lighting direction. In a further exemplary embodiment, the driving headlamps comprise a matrix system consisting of a plurality of LEDs as well as an associated controller, in order to change the lighting direction by adapted activation and deactivation of LEDs in controlled segments of the matrix system. The bending light control unit is a PDBL control unit and can, for example, be realized as a module executed by a programmable apparatus, e.g., a microcontroller or another processor with memory.

The initial bending light control parameter values are starting values present in memory and are, for example, ascertained on the basis of previous test drive data. The bending light control parameter values to be used are those that the bending light control unit is currently actually using for control. At the beginning, these are the initial bending light control parameter values. Later, these are adapted to, i.e., replaced by, the ascertained, updated bending light control parameter values by the control parameter optimization unit.

The classification unit receives the output values of the bending light control unit that correspond to or characterize the control signals with which the lighting directions of the driving headlamps are controlled. These are evaluated by the classification unit in the context of the driving situation, i.e., assigned to one of the predefined performance classes. The classification unit is designed for this purpose as a module that applies an artificial intelligence algorithm based, for example, on an artificial neural network trained during a training phase, wherein the classification of the output values was verified by experts. In another exemplary embodiment, the classification unit uses boosted random forest ensembles. The classification unit is also preferably implemented as a module executed by a programmable apparatus. The programmable apparatus is located permanently on board the vehicle, or at least during the execution of real test drives, depending on the embodiment. In this case it can, for example, also be part of a portable computer connected to the vehicle bus. The performance is continuously classified for specific segments in each case, for example over regular time segments during the journey, or at least during relevant driving segments, i.e. when driving through bends. The classification of the performance is, for example, to be understood per time unit or per reaction of the bending light control unit, or per test journey, or per bend, or per measured value. It is provided in one embodiment that the classifications are stored in a database or are output, for example in tabular form or another data format, so that datasets comprising the input and output values of the bending light control unit over time segments, and the associated performance classes, are available in a training phase of the classification unit.

The control parameter optimization unit receives the output values of the bending light control unit and the associated classifications of the classification unit, as well as the driving trajectory parameter values, i.e., the input values of the bending light control unit, and calculates updated bending light control parameter values, wherein the optimized assignment of the performance to the desired performance class and/or an optimization of the ratio of the number of assignments to the desired performance class to the number of assignments to the further performance classes (i.e. the number of correct reactions of the bending light control unit in comparison with the incorrect reactions) is, for example, applied as a quality criterion. The control parameter optimization unit is also preferably implemented as a module executed by a programmable apparatus.

The method described is thus preferably an at least partially computer-implemented method, i.e. a method that is at least partially executed by a processor of a programmable apparatus.

The method is carried out entirely or partially during at least one journey of the vehicle. This can be a test journey on a particularly suitable test track or can be normal driving operation. The journey can also be a simulated test journey in which, instead of acquiring newly generated driving trajectory parameter values during an actual journey, stored driving trajectory parameter values of a previous journey are recorded.

The behavior of the predictive dynamic bending light function of the lighting system is optimized by the method described, wherein the optimization is made at least also on the basis of current driving trajectory parameter values that are determined individually by how the respective driver controls the vehicle on self-chosen driving routes. The assessment of the current performance of the bending light control unit, i.e. of the PDBL control unit, is made here automatically by a trained classification unit, realized in particular as an AI unit (AI—artificial intelligence), without the classifications having to be assessed again after the training phase by a human being. The system is thus not dependent on the only temporarily available supervision of a human, but can use not only every test journey, but also the normal driving operation for further optimization of the control parameter values of the bending light control unit, wherein an objective, consistent and reproducible classification always occurs, so that the ascertainment of optimized, updated bending light control parameter values for the bending light control unit is also not based on subjective assessments of visual impressions, and can furthermore automatically be carried out very quickly. The genetic algorithm also allows a large number of combinations of bending light control parameter values to be taken into consideration for optimization in a short time.

In one embodiment, the method comprises the ascertainment of updated bending light control parameter values, and the adaptation of the bending light control parameter values to be used to the updated bending light control parameter values, takes place during the at least one journey. An ongoing self-optimization of the performance of the bending light control function can thus occur, adapted to the driving routes of the vehicle and to the individual driving style of the respective driver.

In a further embodiment, the ascertainment of updated bending light control parameter values and the adaptation of the bending light control parameter values to be used to the updated bending light control parameter values takes place after one or a plurality of (real and/or simulated) test journeys have ended. The optimization of a control parameter optimization unit that is not located on board the vehicle can thus, for example, be carried out, so that computers, or even clusters of computers or processors that may be significantly more powerful, can be employed in order to be able to calculate even very complex optimization models quickly.

In one embodiment, the ascertainment of updated bending light control parameter values comprises a performance of a metamodeling of the automatic classification depending on the bending light control parameter values to be used (i.e., the current bending light control parameter values) and stored previous bending light control parameter values to be used, in order to be able to perform a multidimensional optimization making use of the genetic algorithm. The stored previous bending light control parameter values to be used have here been ascertained during previous iterations of the ascertainment of updated bending light control parameter values based on classifications with reference to output values of the bending light control unit from previous time segments of the journey currently being driven and/or during previous journeys of the same or of another vehicle. At least when no previous bending light control parameter values to be used have been ascertained in this way, bending light control parameter values that are, for example, random, or that preferably have been ascertained as suitable, for example using the Latin hypercube sampling method, can be selected from the parameter space as previous bending light control parameter values to be used. In one exemplary embodiment, a Gaussian process regression with automatic relevance determination is used for metamodeling. It can in addition be provided that stored test journey data from a database is used for the metamodeling. Output values are first generated for selected subgroups of bending light control parameters, for example using Latin hypercube samples. The metamodeling then takes place for these, in which possible models are generated that establish the relationship between the bending light control parameter values and the associated classifications of the performance. In this way a number of possible bending light control parameter value sets, limited only by the available computing power, in very many combinations, can be analyzed for a multidimensional optimization.

In one exemplary embodiment, the application of the genetic algorithm comprises performing a global optimization with a non-dominated genetic sorting algorithm, using models generated with the metamodeling. In one preferred embodiment, the NSGA II algorithm (non-dominated sorting genetic algorithm II) is used in order to perform a multi-criterion optimization with varied possible bending light control parameter values, and to ascertain updated bending light control parameter values with which the performance of the bending light control unit is improved. The preferred metamodeling method also supplies information about the relevance of the respective bending light parameters taken into consideration. In one embodiment, the method therefore includes a reduction of the number of bending light control parameters taken into consideration for the optimization by those parameters whose relevance lies below an associated threshold value. The optimization can thus be further accelerated. In one embodiment, furthermore, it is provided that the relevance of the various bending light control parameters is output as their inequality distribution in a dataset that can be represented with a diagram, for example a Pareto diagram, to enable checking in comparison by users such as development engineers. It is also provided in one embodiment that datasets from ascertained, updated bending light control parameter values are stored so that these are available later as individually optimized initial bending light control parameters.

In a further embodiment, the automatic classification comprises use of a trained artificial neural network. The artificial neural network is trained here to classify the performance of the bending light control unit over time on the basis of sets of output values of the bending light control unit, and to assign each to the desired or to the at least one further performance class. Training the artificial neural network on the basis of test journey data and verification of the classifications by experts takes place here in the training phase.

In one exemplary embodiment, the artificial neural network is trained in a training phase with a machine learning method that evaluates at least values of a vehicle speed of the vehicle, of a steering angle of the steering wheel of the vehicle, and of an alignment, i.e. an illumination direction, of driving headlamps of the vehicle. An operating state of the bending light control unit can also be evaluated. The operating state of a trafficator and the engaged gear can, for example also be taken into consideration. The evaluation here also comprises ascertaining the dynamic behavior of the input signals, i.e. the driving trajectory parameter values, over a time segment. An intermediate storage of driving trajectory parameter values in a memory takes place, for example, for this purpose. Because, in particular, training without evaluating camera signals is also possible, the computing effort can be considerably reduced.

In one embodiment, test journey data as well as associated manual classifications of the performance, are here evaluated by experts in the training phase.

In one preferred embodiment, the machine learning method uses an associated machine learning model for each of the performance classes of the classification unit. Boosted decision tree models, i.e., decision tree models with gradient boosting, are preferably used, one for each performance class, wherein driving trajectory parameter values that may have been preprocessed are used to check whether a performance is generated that can be assigned to one of the performance classes has been generated in the associated time segment.

In one embodiment, the desired class relates to a correct reaction of the bending light control unit, and the at least one further class comprises a first and a second further class, wherein the first further class relates to a delayed reaction of the bending light control unit, and the second further class relates to an unstable reaction of the bending light control unit.

In one embodiment, the automatic classification also comprises assigning a trust level to the respective classified performance. The individual classifications can be summed for this purpose over a period of time in order to make final decisions about the classification and then to assign them a trust level. If a machine learning model, for example in each case a boosted decision tree model, is assigned to each of the classes, a trust level can be assigned on the basis of the total number of reactions in the respective class for each machine model.

If a journey has ended, an evaluation of the performance on the whole can also be ascertained for said journey, for which the number of correct, of delayed, and of unstable reactions of the bending light control unit and, optionally, also the total time during which the bending light control unit was active, can be taken into consideration. In one embodiment it is provided that these results are automatically stored and/or displayed in text form and/or graphically.

In one embodiment, it is provided that the at least one journey is simulated with stored available test journey data. These can, for example, be kept in a database with stored CAN bus data for different stored test journeys. In this embodiment, the bending light control unit can also be executed by a programmable apparatus, for example a stationary computer, that is not on board a vehicle.

According to a second aspect, a lighting system for a vehicle, with automatically self-optimizing predictive dynamic bending light function, comprises a driving headlamp apparatus designed to change an illumination direction of the driving headlamp apparatus in response to control signals, a bending light control unit connected to the driving headlamp apparatus, configured with initial bending light control parameter values as bending light control parameter values to be used, and designed to transmit control signals for controlling the illumination direction to the driving headlamp apparatus, a classification unit, connected to the bending light control unit, configured for automatically classifying a performance of the bending light control unit into a desired performance class and at least one further performance class, depending on output values of the bending light control unit, a control parameter optimization unit connected to the bending light control unit and the classification unit, for ascertaining updated bending light control parameter values depending on input values of the bending light control unit and classifications of the performance of the bending light control unit assigned to the input values, and a driving trajectory parameter acquisition apparatus configured to acquire driving trajectory parameter values and to transmit the driving trajectory parameter values as input values to the bending light control unit during at least one journey of the vehicle, wherein the lighting system is configured to perform a method for automatically optimizing of a predictive dynamic bending light function according to the first aspect of the disclosure. The advantages and special features of the method according to the disclosure for automatically optimizing a predictive dynamic bending light function of a lighting system of the vehicle, including any of its embodiments, are thus also implemented, including in the context of a suitable lighting system for a vehicle, with automatically self-optimizing predictive dynamic bending light function.

In one preferred embodiment, the lighting system comprises a programmable apparatus comprising at least one processor and a memory, wherein the bending light control unit, the classification unit and the control parameter optimization unit are modules that can be executed by the processor, and wherein the memory contains code components that, when loaded by the processor, cause this to execute the modules and to perform the method.

According to a third aspect, a vehicle comprises a lighting system according to the second aspect of the disclosure, and according to a fourth a computer program product also comprises code elements which, when loaded from memory into a processor of a programmable apparatus of a lighting system for a vehicle with automatically self-optimizing predictive dynamic bending light function, configure these to execute a method according to the first aspect above. The advantages and special features of the method according to the disclosure for automatically optimizing a predictive dynamic bending light function of a lighting system of a vehicle, including any of its embodiments, are thus also implemented in the context of a vehicle with a lighting system with automatically self-optimizing predictive dynamic bending light function suitable for performing the method, as well as in the context of a computer program product for configuring the lighting system for performing the method for automatically optimizing a predictive dynamic bending light function of a lighting system of a vehicle.

BRIEF SUMMARY OF THE DRAWINGS

Further advantages of the present disclosure can be seen in the detailed description and the drawings. The disclosure is explained in more detail below, also in association with the following description of exemplary embodiments with reference to be accompanying drawings, in which.

It will be understood that other embodiments can be used and that structural or logical changes can be made without deviating from the scope of the present disclosure. It will be understood that the features of the different exemplary embodiments described above and below can be combined with one another except where specifically stated otherwise. The description is therefore not to be understood in a restrictive sense, and the scope of protection is defined by the appended claims.

DETAILED DESCRIPTION

Figure 1:
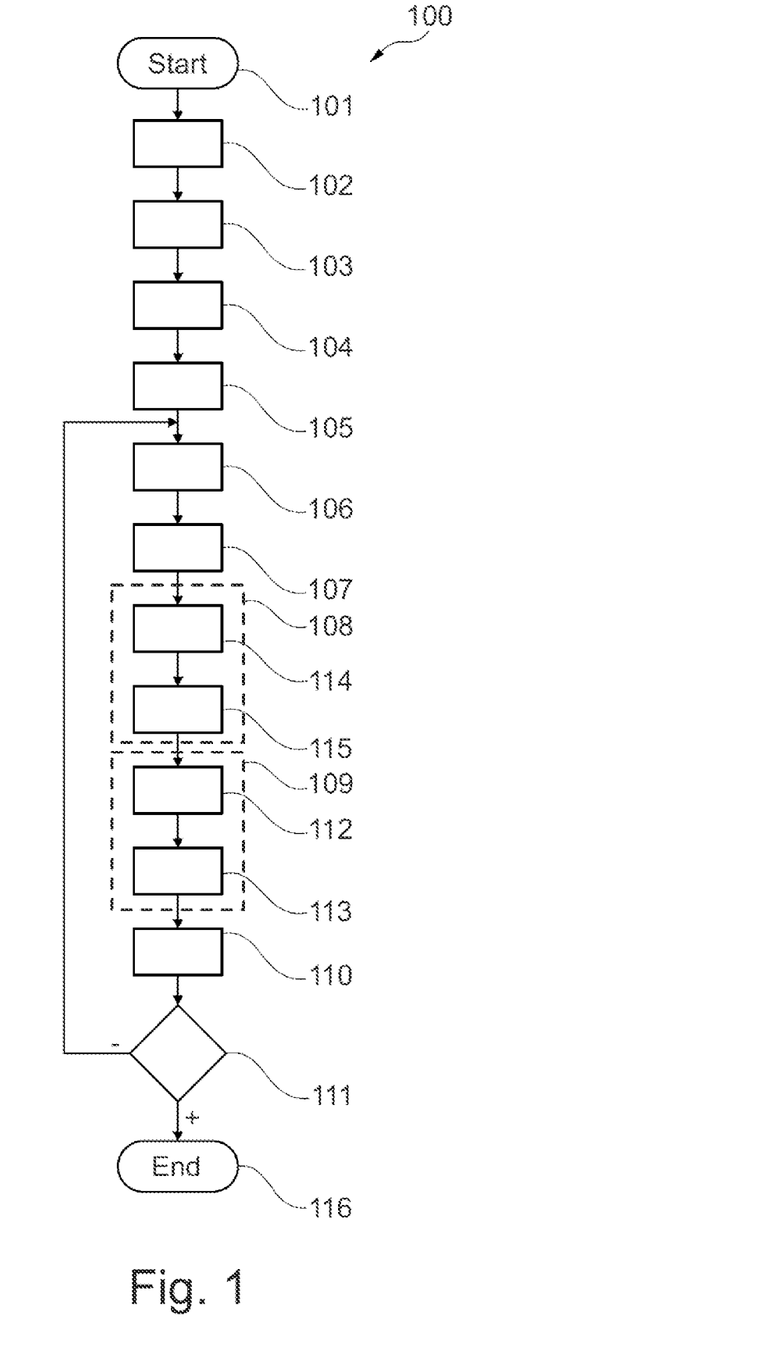
FIG. 1 shows a schematic illustration of an example of a method for automatically optimizing a predictive dynamic bending light function of a lighting system of a vehicle according to one embodiment.

A schematic illustration of an example of a method 100 for automatically optimizing a predictive dynamic bending light function of a lighting system of a vehicle according to one embodiment of the disclosure is shown in FIG. 1. The method 100 begins in a start state 101 at the beginning of a journey with the vehicle that has the lighting system whose predictive dynamic bending light function is to be optimized. In the illustrated embodiment, however, the performance 102 of a training phase now takes place first, in which an artificial neural network of a classification unit for automatically classifying a performance of a bending light control unit into a desired performance class and at least one further performance class, depending on output values of the bending light control unit, is trained with a machine learning method that evaluates at least values of a vehicle speed of the vehicle, a steering angle of the steering wheel of the vehicle, and an alignment of driving headlamps of the vehicle. In another embodiment, the artificial neural network is already trained. The training can here be carried out with the same vehicle and the same driver, but also with a different vehicle and/or a different driver, or, independently of the vehicle, on the basis of a database of stored test journey datasets.

Steps now follow of configuring 103 a bending light control unit for controlling the lighting system of the vehicle with initial bending light control parameter values as bending light control parameter values to be used, of configuring 104 a classification unit (connected to the bending light control unit) for automatically classifying a behavior of the bending light control unit into a desired performance class and at least one further performance class, depending on output values of the bending light control unit, and of configuring 105 a control parameter optimization unit for ascertaining updated bending light control parameter values depending on input values of the bending light control unit and classifications of the performance of the bending light control unit assigned to the input values.

Acquiring 106 driving trajectory parameter values as the input values of the bending light control unit during at least one journey of the vehicle takes place in a further step, followed by steps of ascertaining 107 output values of the bending light control unit and of automatically classifying 108 the performance of the bending light control unit depending on the ascertained output values during the at least one journey. In the illustrated embodiment, this comprises use 114 of the trained artificial neural network as well as, in addition, assigning 115 a trust level to the respectively classified performance.

The method is now continued with the ascertainment 109 of updated bending light control parameter values. In the embodiment illustrated in FIG. 1, this comprises a performance 112 of a metamodeling of the automatic classification depending on the bending light control parameter values to be used and stored, previous, bending light control parameter values to be used, in order to be able to perform a multidimensional optimization making use of the genetic algorithm, as well as the application 113 of a genetic algorithm with which a frequency of a classification of the performance of the bending light control unit into the desired performance class is increased. The stored previous bending light control parameter values to be used have been ascertained here during previous iterations of the ascertainment of updated bending light control parameter values based on classifications with reference to output values of the bending light control unit from previous time segments of the journey currently being driven and/or during previous journeys of the same or of another vehicle. At least when no previous bending light control parameter values to be used have been ascertained in this way, bending light control parameter values that are, for example, random, or that preferably have been ascertained as suitable, for example using the Latin hypercube sampling method, can be selected from the parameter space as previous bending light control parameter values to be used. No metamodeling is carried out if no previous bending light control parameter values to be used are available.

In the illustrated embodiment, this preferably comprises performing a global optimization with a non-dominated genetic sorting algorithm, using models generated with the metamodeling. The performance 112 of the metamodeling also comprises first performing a cleaning and preparation of the data for the metamodeling.

After the ascertainment 109 of updated bending light control parameter values, an adaptation 110 of the bending light control parameter values to be used to the updated bending light control parameter values then takes place, for example during the at least one journey.

In a step of checking 111 whether the optimization of the predictive dynamic bending light function should end, a check is carried out as to whether an associated termination criterion is satisfied. The criterion is, for example, satisfied if the bending light control unit, or the lighting system, or the vehicle is deactivated. It can also be provided that optimization is ended after the journey has ended, while it is also possible to continue the optimization over a plurality of journeys. It can also be provided that the optimization is ended if the respective, newly ascertained, updated bending light control parameter values (within a tolerance range, if relevant) no longer deviate from the bending light control parameter values to be used that are valid up to that point. It can also be provided that a final test journey ends the optimization, wherein the control of the lighting controller is subjected to a quality check, for example by an expert. Depending on the embodiment, the termination criterion can, for example, be one of those mentioned previously, or a combination of more than one.

If the checking 111 shows that the optimization should not end (shown in FIG. 1 with a "−"), the method is continued with the acquisition 106 of further driving trajectory parameter values. If the checking 111 shows that the optimization should end (shown in FIG. 1 with a "+"), the method proceeds to an end state 116.

Figure 2:
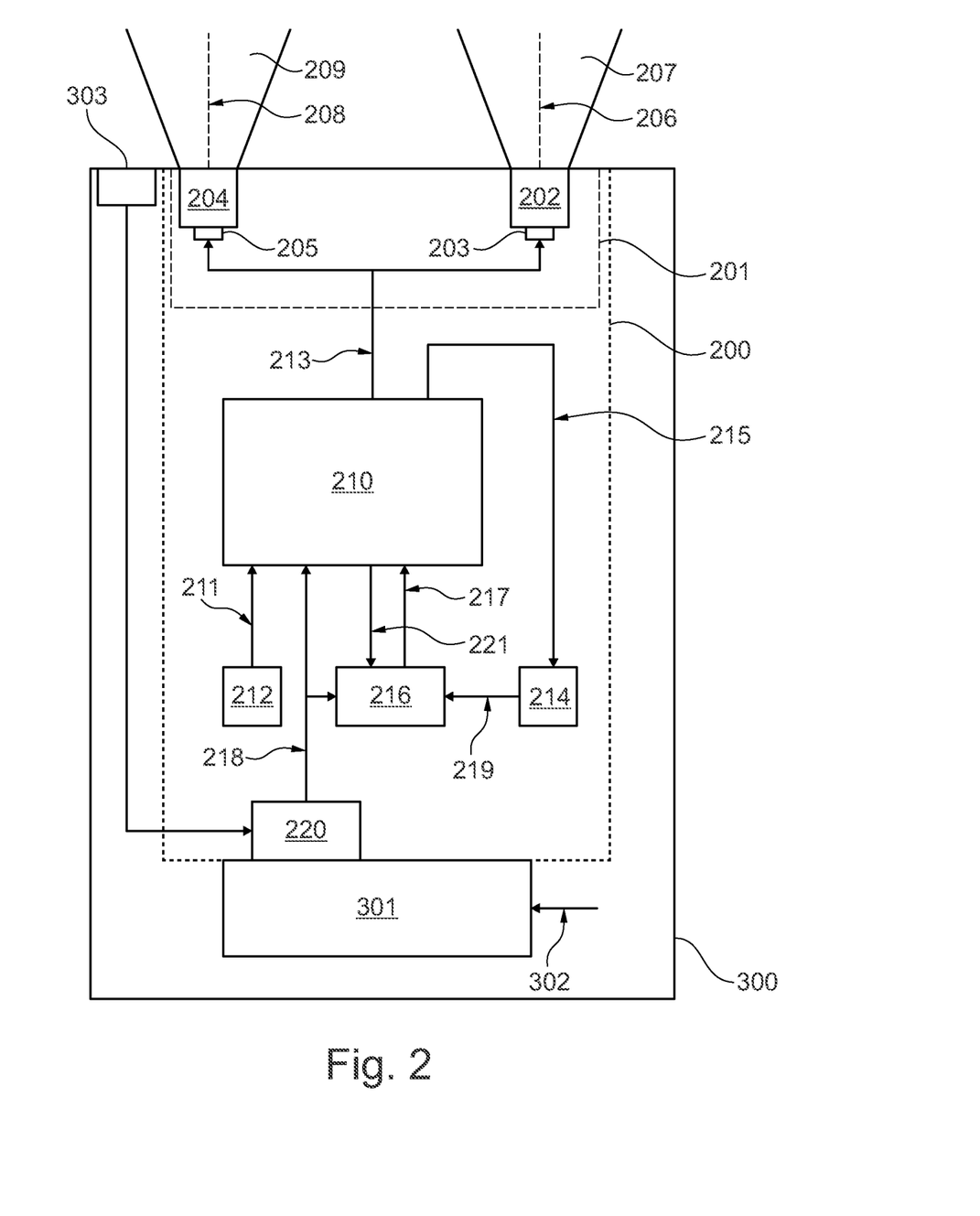
FIG. 2 shows a schematic illustration of an example of a vehicle with a lighting system with automatically self-optimizing predictive dynamic bending light function according to a further embodiment.

A schematic illustration of an example of a vehicle 300 with a lighting system 200 with automatically self-optimizing predictive dynamic bending light function according to a further embodiment of the disclosure is shown in FIG. 2. In addition to the lighting system 200, the vehicle 300 in particular comprises a vehicle bus, a CAN bus 301 in the illustrated embodiment, via which the driving trajectory parameter values 302 can be received. This involves values from sensor signals, each recorded with suitable sensors, such as the profile of the steering angle of the steering wheel of the vehicle, the vehicle speed, the yaw rate, the engaged gear and/or the state of the trafficator, said values characterizing the driving trajectory (including the operating state of the vehicle during the journey). Video recordings of a front camera 303 which, in the illustrated embodiment, has a video analysis module, i.e. a programmable apparatus that is configured to ascertain the road course from the video recordings, supply further driving trajectory parameter values, either again via the CAN bus 301 of the vehicle 300 or, as shown in FIG. 1, directly to a driving trajectory parameter acquisition apparatus 220 of the lighting system 200. The driving trajectory parameter acquisition apparatus 220 comprises, in particular, an interface in order to receive the driving trajectory parameter values 302 from the CAN bus 301.

The illustrated lighting system 200 of the vehicle has an automatic self-optimizing predictive dynamic bending light function. This means that a driving headlamp apparatus 201 is designed to change an illumination direction 206, 208, i.e. a lighting direction of the driving headlamp apparatus 201, in response to control signals 213 of a bending light control unit 210. In the embodiment shown in FIG. 1, the driving headlamp apparatus 201 has a rotatably mounted right-hand driving headlamp 202 connected to a first drive motor 203, and a rotatably mounted left-hand driving headlamp 204 connected to a second drive motor 205, wherein the drive motors 203, 205 receive the control signals 213 and are designed to turn the right-hand driving headlamp 202 and the left-hand driving headlamp 204 depending on the control signals 213 each through an angle, in order to improve the illumination of the road by the first light cone 207 with the first illumination direction 206 of the right-hand driving headlamp 202 and the second light cone 209 with the second illumination direction 208 of the left-hand driving headlamp 204 when the vehicle 300 travels through a bend. In a further exemplary embodiment (not illustrated), the driving headlamps 202, 204 are not necessarily mounted rotatably and pivotable using drive motors 203, 205, but rather comprise a matrix system consisting of a plurality of LEDs and a controller in order to change the illumination direction 206, 208 through appropriate activation and deactivation of LEDs in controlled segments of the matrix system.

The lighting system in addition comprises the bending light control unit 210 that is designed to transmit the control signals 213 for controlling the illumination direction 206, 208 of the right-hand and of the left hand driving headlamps 202, 204 to the first and second drive motor 203, 205 to the driving headlamp apparatus 201. The bending light control unit 210 is connected for this purpose to the driving headlamp apparatus 201 and initialized with initial bending light control parameter values 211 as bending light control parameter values to be used. The initial bending light control parameter values can be ascertained in a training phase, or can already be ascertained in advance and available in a memory 212 in order to be loaded by the bending light control unit 210.

The bending light control unit 210 is moreover connected to a classification unit 214 implemented as an AI unit, that is configured, for example programmed, for automatically classifying a performance of the bending light control unit 210 into a desired performance class and at least one further performance class, depending on output values 215 of the bending light control unit 210. Depending on the format of the control signals 213, the output values 215 of the bending light control unit 210 can be identical to the control signals 213, or can have a different format which, however, characterizes the control signals (for example rotation angle figures instead of activation durations of the drive motors).

The lighting system 200 also comprises a control parameter optimization unit 216 connected to the bending light control unit 210 and the classification unit 214, for ascertaining updated bending light control parameter values 217 depending on input values 218 of the bending light control unit 210 and classifications 219 of the performance of the bending light control unit 210 into the respective performance classes assigned to the input values 218. The driving trajectory parameter acquisition apparatus 220 is also configured to acquire driving trajectory parameter values 302. The driving trajectory parameter acquisition apparatus 220 comprises an interface to the CAN bus 301 of the vehicle 300, via which, and also, if relevant, directly, driving trajectory parameter values 302 are received from a front camera 303 of the vehicle 300, and are transmitted as input values of the bending light control unit 210 while the vehicle is travelling to said driving trajectory parameter acquisition apparatus, and also (directly or indirectly) to the control parameter optimization unit 216.

It is provided in one embodiment that the bending light control unit 210, the classification unit 214 and the control parameter optimization unit 216 are implemented as circuits and/or with the aid of programmable logic circuits. In a further embodiment it is provided that the lighting system 200 comprises a programmable apparatus that comprises at least one processor and a memory, for example the memory 220, while the bending light control unit 210, the classification unit 214 and the control parameter optimization unit 216 are (in whole or in part) modules that can be executed by the processor, and the memory contains code segments, i.e. program code, which, when loaded by the processor, cause it to execute the modules and configure the lighting system 200 to perform the method 100 for automatically optimizing a predictive dynamic bending light function described in connection with FIG. 1.

It will be understood that although method steps are described in accordance with a certain ordered sequence, they could in part be carried out in a sequence other than that described here. It will also be obvious that certain steps may be carried out simultaneously or in sequence, once or a plurality of times, that other steps may be added, or that certain steps described here may be omitted. In other words, the present descriptions are provided for the purposes of clarifying particular embodiments, and should not be understood as a restriction of the disclosed object.

Although the invention has been more closely illustrated and described in more detail through the preferred exemplary embodiments, the invention is not restricted by the disclosed examples, and other variations can be derived from this by the expert without going beyond the scope of protection of the invention. The invention should therefore not be restricted to individual embodiments, but only by the appended claims.

LIST OF REFERENCE SIGNS

100 Method
101 Start
102 Performing a training phase
103 Configuring a bending light control unit
104 Configuring a classification unit
105 Configuring a control parameter optimization unit
106 Acquiring driving trajectory parameter values
107 Ascertaining output values of the bending light control unit
108 Automatic classification
109 Ascertaining updated bending light control parameter values
110 Adapting the bending light control parameter values to be used
111 Checking whether the optimization should end
112 Performing a metamodeling
113 Application of a genetic algorithm
114 Using a trained artificial neural network
115 Assigning a trust level
116 End
200 Lighting system
201 Driving headlamp apparatus
202 Rotatably mounted right-hand driving headlamp
203 First drive motor for turning the right-hand driving headlamp
204 Rotatably mounted left-hand driving headlamp
205 Second drive motor for turning the left-hand driving headlamp
206 First illumination direction
207 First light cone
208 Second illumination direction
209 Second light cone
210 Bending light control unit
211 Initial bending light control parameter values
212 Memory
213 Control signals
214 Classification unit
215 Output values of the bending light control unit
216 Control parameter optimization unit
217 Updated bending light control parameter values
218 Input values of the bending light control unit
219 Classifications
220 Driving trajectory parameter acquisition apparatus
221 Bending light control parameter values to be used
300 Vehicle
301 CAN bus
302 Driving trajectory parameter values
303 Front camera with video analysis module

The invention claimed is:

1. A programmable apparatus comprising a processor and a memory, comprising programming stored in the memory such that the processor is programmed to:

control a lighting system of a vehicle with initial bending light control parameter values, wherein the lighting system includes a headlamp apparatus with an illumination direction that is changeable;

provide classifications of a performance of the lighting system into a target performance class and at least one non-target performance class, based on output values when the lighting system is controlled with the initial bending light control parameter values; and ascertain updated bending light control parameter values based on driving trajectory parameter input values to the lighting system, and ones of the classifications of the performance of the lighting system that are assigned to the driving trajectory parameter input values;

wherein ascertaining the updated bending light control parameter values includes applying a genetic algorithm with which a frequency of the classification of the performance of the lighting system into the target performance class is increased;

wherein the target class corresponds to a correct reaction of the lighting system, and the at least one non-target class corresponds to an incorrect reaction of the lighting system.

2. The apparatus of claim 1, wherein ascertaining the updated bending light control parameter values takes place during at least one journey.

3. The apparatus of claim 2, wherein the at least one journey is simulated.

4. The apparatus of claim 1, wherein ascertaining the updated bending light control parameter values includes performing a metamodelling of providing the classifications based on current bending light control parameter values and previously stored bending light control parameter values.

5. The apparatus of claim 4, wherein the genetic algorithm is globally optimized with a non-dominated genetic sorting algorithm, based on models generated with the metamodeling.

6. The apparatus of claim 1, wherein the classifications are output from a trained artificial neural network.

7. The apparatus of claim 6, wherein the artificial neural network is trained in a training phase that includes inputting at least a vehicle speed, a steering angle, and an alignment of headlamps.

8. The apparatus of claim 6, wherein the trained artificial neural network includes respective machine learning models for each of the target performance class and at least one non-target performance class.

9. The apparatus of claim 1, wherein the at least one non-target class comprises a first and a second non-target class, wherein the first non-target class relates to a delayed reaction of the lighting system, and the second non-target class relates to an unstable reaction of the lighting system.

10. The apparatus of claim 1, wherein the classifications are assigned respective trust levels.

11. A method comprising:
controlling a lighting system of a vehicle with initial bending light control parameter values, wherein the lighting system includes a headlamp apparatus with an illumination direction that is changeable;

providing classifications of a performance of the lighting system into a target performance class and at least one non-target performance class, based on output values when the lighting system is controlled with the initial bending light control parameter values; and ascertaining updated bending light control parameter values based on driving trajectory parameter input values to the lighting system, and ones of the classifications of the performance of the lighting system that are assigned to the driving trajectory parameter input values;

wherein ascertaining the updated bending light control parameter values includes applying a genetic algorithm with which a frequency of the classification of the performance of the lighting system into the target performance class is increased;

wherein the target class corresponds to a correct reaction of the lighting system, and the at least one non-target class corresponds to an incorrect reaction of the lighting system.

12. The method of claim 11, wherein ascertaining the updated bending light control parameter values takes place during at least one journey.

13. The apparatus of claim 12, wherein the at least one journey is simulated.

14. The method of claim 11, wherein ascertaining the updated bending light control parameter values includes performing a metamodelling of providing the classifications based on current bending light control parameter values and previously stored bending light control parameter values.

15. The apparatus of claim 14, wherein the genetic algorithm is globally optimized with a non-dominated genetic sorting algorithm, based on models generated with the metamodeling.

16. The method of claim 11, wherein the classifications are output from a trained artificial neural network.

17. The apparatus of claim 16, wherein the artificial neural network is trained in a training phase that includes inputting at least a vehicle speed, a steering angle, and an alignment of headlamps.

18. The apparatus of claim 16, wherein the trained artificial neural network includes respective machine learning models for each of the target performance class and at least one non-target performance class.

19. The method of claim 11, wherein the at least one non-target class comprises a first and a second non-target class, wherein the first non-target class relates to a delayed reaction of the lighting system, and the second non-target class relates to an unstable reaction of the lighting system.

20. The method of claim 11, wherein the classifications are assigned respective trust levels.

* * * * *